United States Patent
Simpson

[15] 3,698,169
[45] Oct. 17, 1972

[54] GATHERING APPARATUS

[72] Inventor: Lee S. Simpson, 440 North Cornelia, Fresno, Calif. 93706

[22] Filed: Feb. 3, 1971

[21] Appl. No.: 112,312

[52] U.S. Cl. ........................56/328, 15/78, 214/356
[51] Int. Cl. .............................................A01g 19/00
[58] Field of Search ............56/328, 327; 171/63, 58; 214/356; 15/97, 79, 78, 82, 83, 84

[56] References Cited

UNITED STATES PATENTS

| | | | |
|---|---|---|---|
| 2,542,871 | 2/1951 | Johnson | 56/28 UX |
| 2,771,078 | 11/1956 | Summers | 56/DIG. 1 |
| 3,108,418 | 10/1963 | Henderson | 56/28 |
| 3,143,841 | 8/1964 | Kirtland | 56/28 |
| 1,053,233 | 2/1913 | Shira | 15/84 |
| 1,673,780 | 6/1928 | Sargent | 15/84 |
| 2,484,437 | 10/1949 | Wells | 214/356 |
| 2,065,169 | 12/1936 | Carpenter | 56/328 R |
| 3,475,889 | 11/1969 | Overstreet et al | 56/328 R |
| 3,387,442 | 6/1968 | Henson | 56/328 R |
| 3,566,893 | 3/1971 | Richardson | 56/328 R X |
| 2,940,242 | 6/1960 | Patterson | 56/328 R |
| 2,729,046 | 1/1956 | Patterson | 56/328 R |
| 2,562,775 | 7/1951 | Crull | 56/328 R |
| 3,331,197 | 7/1967 | O'Brien | 56/327 R |

*Primary Examiner*—Russell R. Kinsey
*Attorney*—Huebner & Worrel

[57] ABSTRACT

A gathering apparatus particularly suited for use in harvesting nuts and similar discrete articles. The apparatus is characterized by a pair of converging wings horizontally extended to scrape the surface of the ground to form a window of articles being gathered and a driven impeller having a circular periphery supported to receive the articles in operative engagement, for ejecting the articles from the windrow along an upwardly directed trajectory to an inclined conveyor having a discharge opening disposed above a portable article-receiving bin, whereby randomly deposited articles, such as nuts deposited beneath parent trees, can readily be gathered and rapidly delivered into an article-receiving bin.

9 Claims, 8 Drawing Figures

PATENTED OCT 17 1972
3,698,169
SHEET 1 OF 2
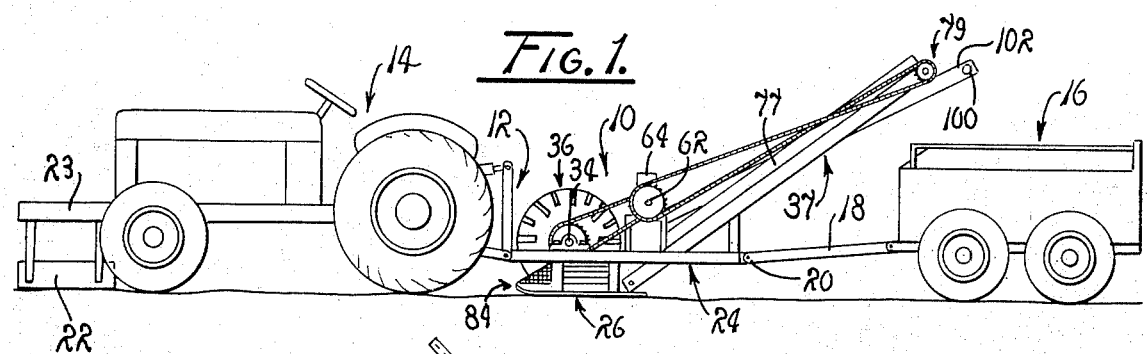
Fig. 1.
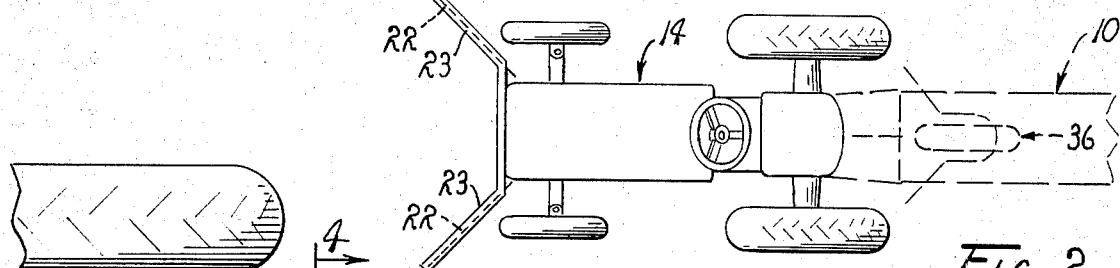
Fig. 2.
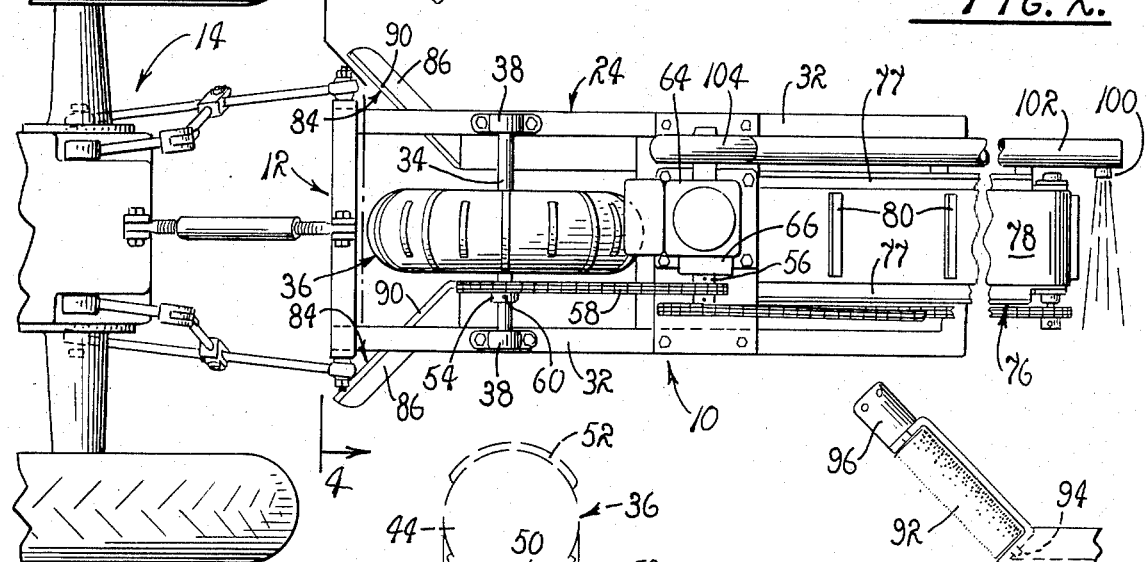
Fig. 3.
Fig. 4.
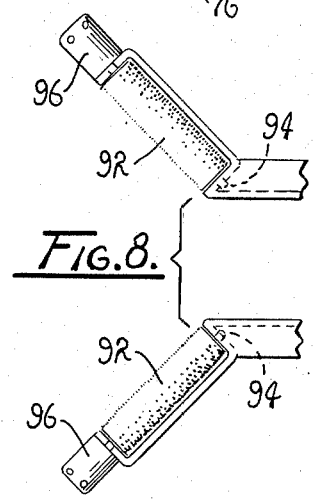
Fig. 8.
LEE S. SIMPSON
INVENTOR
Huebner & Worrel
ATTORNEYS

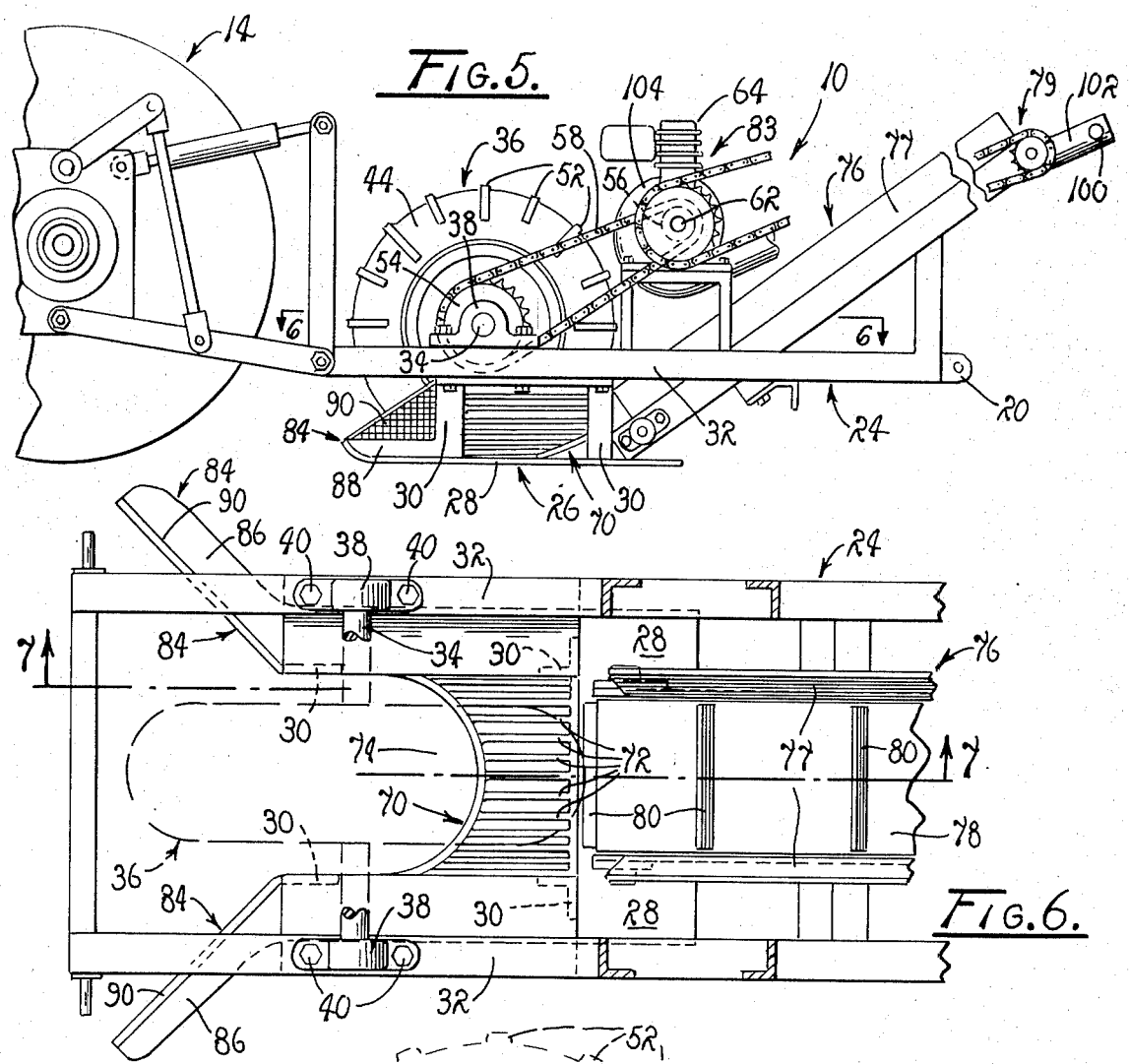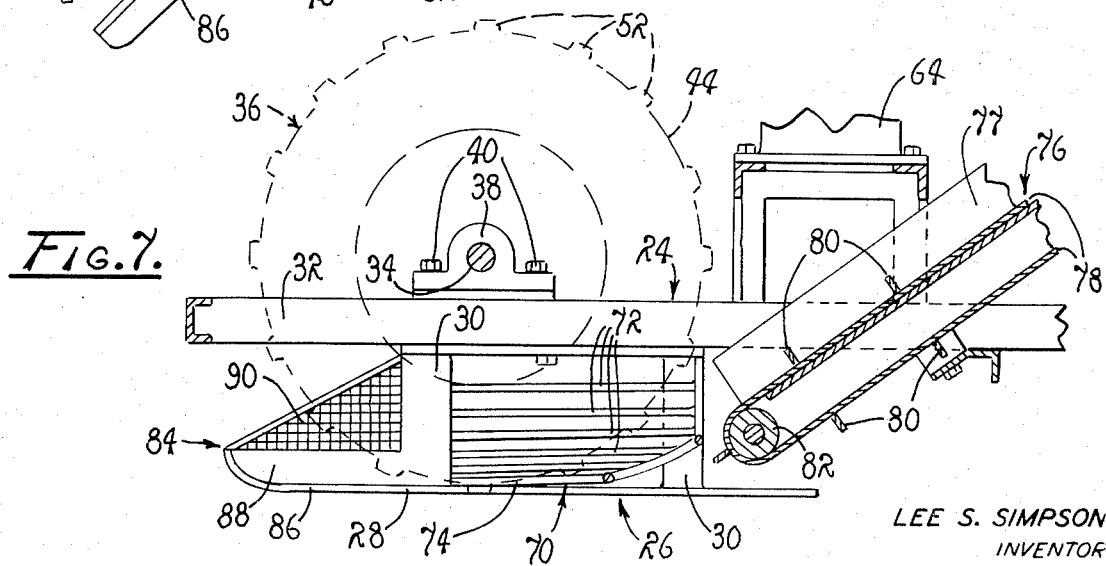

GATHERING APPARATUS

BACKGROUND OF THE INVENTION

The invention resides in a gathering apparatus for gathering discrete, randomly distributed articles, and more particularly to an apparatus for use in harvesting nuts and the like.

The prior art includes various types of apparatus for gathering discrete articles from planar surfaces. Among such types are those which are employed in harvesting nut crops and the like. However, known gathering apparatus currently available for use in harvesting nut crops tend to be complex in construction and often economically expensive to purchase and to operate. Consequently, where nut-harvesting operations are conducted on a rather small limited scale, use of apparatus heretofore available often tends to be impractical. Hence, there currently exists a need for an economically feasible, simple and practical article gathering apparatus having a capacity for efficiently and economically gathering nut crops.

OBJECTS AND SUMMARY OF THE INVENTION

It is therefore an object to provide a simple, economic, and efficient article gathering apparatus.

It is another object of the instant invention to provide an improved gathering apparatus for use in gathering discrete articles randomly distributed on a substantially planar surface.

It is another object to provide an improved nut-gathering apparatus for use in nut-gathering operations.

It is another object to provide an improved gathering apparatus to be towed behind a wheel tractor and employed in gathering nuts from beneath parent trees.

It is another object to provide an efficient, economic, and practical nut-gathering apparatus mountable through a three-point hitch on a wheel tractor and employable by a single operator for gathering and delivering matured walnuts randomly deposited on the surface of the ground beneath parent trees.

These and other objects and advantages are achieved through the use of an apparatus having a pair of collecting wings for windrowing articles, such as walnuts and the like, a driven impeller including a resilient peripheral surface supported for travel along a path coincident with a windrow formed by the collecting wings for receiving and delivering the nuts from the windrows to an upwardly inclined, endless conveyor belt, a blower for pneumatically sweeping foreign matter from the nuts conveyed by the conveyor belt and a portable receiving bin into which the conveyor is permitted to discharge the nuts conveyed thereby.

BRIEF DESCRIPTION OF THE DRAWINGS

FIG. 1 is a side elevation of a gathering apparatus which embodies the principles of the instant invention.

FIG. 2 is a fragmented, top plan view of a portion of the structure shown in FIG. 1.

FIG. 3 is a fragmented top plan view, on somewhat of an enlarged scale, of the gathering device shown in FIG. 1.

FIG. 4 is a partially sectioned and elevation, taken generally along lines 4—4 of FIG. 3, illustrating an arrangement of one form of a pair of delivery wings employed by the apparatus.

FIG. 5 is a side elevation of the gathering apparatus shown in FIG. 3.

FIG. 6 is a partially sectioned top plan view of the structure shown in FIG. 5, taken generally along lines 6—6 in FIG. 5.

FIG. 7 is a sectional view, taken generally along lines 7—7 of FIG. 6.

FIG. 8 is a fragmented view illustrating an alternate form of delivery wings which are employed by the apparatus.

DESCRIPTION OF THE PREFERRED EMBODIMENT

Referring now to the drawings wherein like reference characters designate like or corresponding parts throughout the several views, there is shown in FIG. 1 a gathering apparatus 10 which embodies the principles of the instant invention.

As illustrated, the gathering apparatus 10 is particularly suited to be coupled through a so-called three-point hitch 12 to a wheeled tractor 14 which, in operation, serves as a towing vehicle. Of course, the vehicle employed as a towing vehicle can be of any suitable design, and while a three-point hitch has a capability for supporting the frame 24 at a predetermined elevation relative to the ground, supporting wheels, not shown, can be utilized for this purpose.

To the gathering apparatus 10 there is coupled in tandem a portable article-receiving bin 16. In practice, the bin 16 is a suitably configured trailer coupled to the gathering apparatus 10 through a convenient tongue 18 having a terminal clevis adapted to be pinned to a hitch 20. The hitch 20, in turn, is welded to the trailing portion of the gathering apparatus.

Preferably, a pair of diverging article-collecting wings 22 is provided for collecting the articles. These wings are extended forwardly and obliquely from opposite sides of the path of travel of the tractor 14 and are employed for sweeping nuts and similar discrete articles being gathered into windrows as the tractor 14 traverses a given surface on which articles are deposited in a random fashion. The wings 22 are suspended from a suitable support 23 mounted near the forward end of the tractor 14 and, preferably, function as extended blades for scraping the surface and imparting lateral motion to the articles engaged thereby for thus causing the articles to be collected and arranged in elongated windrows.

The gathering apparatus 10 includes a frame, generally designated 24, formed of suitable beams welded or otherwise coupled into a rigid structure. A skid member or drag plate 26 cooperates with the hitch 12 in supporting the apparatus, and, as a practical matter, includes a pair of parallel runners 28, FIG. 5. These runners have a planar surface of a collective width sufficient to support the gathering apparatus 10 through a plurality of stanchions 30. Hence, the runners 28 serve as a sliding base for supporting the frame 24 as it is towed by the tractor 14.

The frame 24 also includes a pair of laterally spaced longitudinally extended, coplanar beams 32. Between these beams there is coupled an axle 34 for a driven impeller, generally designated 36, which serves to engage and impel articles collected into windrows by the wings 22 along an upwardly directed trajectory toward an article transfer device 37, FIG. 1, which serves to deliver the articles being gathered into the article-receiving bin 16.

The axle 34 is supported at its opposite ends by a pair of concentrically related annular bearings, not designated, seated in suitable bearing cases 38.

The bearing cases 38, in turn, are mounted on the beams 32 in any suitable manner. As currently employed, the bearing cases 38 are joined with the beams 32 through a pair of screw-threaded pins 40 which extend through a pair of ears, not designated, appropriately formed on the bearing cases and arranged to coincide with openings suitably formed in the horizontal beams 32. Of course, the particular manner in which the bearing cases 38 are joined with the horizontal beams is a matter of convenience and can be varied as preferred. Also, if so desired, the bearing cases 38 can be mounted on the stanchions 30 rather than on the horizontal beams 32.

The impeller 36 includes a rigid central disk 42 concentrically related to the axle 34 and is supported thereby. This disk is, in turn, circumscribed by a peripheral member 44 formed of a resilient material and is supported to engage the articles deposited in windrows by the collecting wings 22. The central disk 42 preferably is pinned to the axle 34 through a keyway coupling, generally designated 46, however, the disk 42 can be coupled with the axle 34 in any desired manner, so long as a fixed relationship is established therebetween.

While the peripheral member 44 can be formed of any suitable material, in practice, the member is a pneumatically inflated tube, formed of a resilient material, seated in an annular rim 50, FIG. 4, circumscribing the periphery of the disk 42. The peripheral member 44 is supported in the rim 50 in a manner such that relative motion therebetween is precluded. Therefore, it should readily be apparent that as rotation is imparted to the axle 34 the member 44 is driven in rotation. The member 44 also is provided with a plurality of article-engaging, transverse cleats 52 spaced at equidistances about its periphery, FIG. 5, which function to provide an assist in propelling the articles toward the transfer device 37.

In order to drive the axle 34 in rotation, a driven sprocket 54 concentrically is supported by the axle 34 and pinned thereto in a suitable manner. The driven sprocket 54 is coupled with a driving sprocket 56 through an endless drive chain 58. Where so desired, the sprocket 54 is pinned to the axle 34 employing a pin coupling 60, FIG. 4, although other couplings can be employed equally as well. The driving sprocket 56, in turn, is coupled with a rotatably supported output shaft 62 of a power plant 64, FIG. 3.

The power plant 64, of course, is of any suitable design. For example, while a one-cylinder gasoline motor preferably is employed, an hydraulic motor can be employed without reducing the overall efficiency of the apparatus. An output gear box 66 is provided for coupling the output shaft 62 with the power plant 64. Since the particular power plant, as well as the associated gear box employed in driving the output shaft 62, is deemed to be a matter of preference and is varied as desired, a detailed description thereof is omitted in the interest of brevity. It is, in any event, to be understood that the power plant 64 serves as a source of power for driving the impeller 36 and the angular direction in which the axle 34 is driven by the power plant 64 preferably is consistent with the direction of travel of the gathering apparatus 10. However, the rate at which the axle 34 is rotated is such that the peripheral surface of the resilient peripheral member 44 exceeds the ground speed of the apparatus. Thus a sliding motion between the surface of the ground and the surface of the member 44 continuously is achieved as the tractor 14 tows the apparatus 10 along a selected path.

Immediately adjacent to the peripheral member 44, near its lowermost portion, the impeller 36 is provided with an arcuate ramp 70. This ramp includes an article support, not designated, generally conforming to the curvature of the surface of the member 44. The ramp 70 serves as a slide plate for the articles deposited into windrows and is formed from a plurality of rods 72. The rods are so spaced as to permit foreign matter, such as dirt, rocks, leaves and the like to drop therebetween as the articles being gathered are transferred therealong. The surface of the ramp 70 is so spaced from the peripheral surface of the resilient member 44 that together the adjacent surfaces define a throat 74 through which discrete articles being gathered are passed as the impeller 36 is driven in rotation.

As best illustrated in FIG. 7, the ramp 70 extends from beneath the member 44 to a terminal point located adjacent to the transfer device 37. In practice, the transfer device 37 includes an endless conveyor 76 confined between upstanding side plates 77. These plates define therebetween a trough which receives the articles ejected from the impeller 36.

The conveyor 76 includes an endless belt 78 which extends from a point adjacent to the impeller to an elevated, discharge zone 79. The belt 78 is provided with spaced flight bars 80 and is entrained about a pair of supporting rollers 82. The rollers 82, of course, are supported by suitable upstanding structural members, not designated, fixed to the frame 24. The rollers 82 are driven through a chain-and-sprocket coupling 83 also associated with the output shaft 62 and driven thereby in a manner similar to that in which the sprockets 54 and 56 and the chain 58 serve to drive the axle 34 of the impeller 36.

In order to deliver articles to be advanced through the throat 74, the articles are received between a pair of angularly related delivery wings 84. These wings extend outwardly and forwardly from opposite sides of the lowermost portion of the ramp 70 and serve to direct articles being gathered into the throat 74 as the apparatus 10 is advanced. In practice, each of the wings 84 includes a base runner 86 of a planar configuration supported by a stanchion 30. Each of the runners 86 also is in sliding engagement with the surface of the ground and includes an upstanding guide plate 88 positioned to engage the articles being gathered. In practice, a screen 90, FIG. 4, extends upwardly from each of the guide plates 88 and serves to assist the plate in guiding articles into the throat 74. Preferably, the screen is of a mesh size which permits dirt, gravel and the like to pass therethrough while the articles being gathered are retained between the wings.

As illustrated in FIG. 8, the delivery wings can be formed of a pair of counter-rotating brushes 92. These brushes are supported for rotation by suitable axles 94 and are driven by a pair of suitable hydraulic motors 96. For readily apparent reasons, the brushes 92 preferably are driven in a direction generally opposing the direction of travel of the gathering apparatus 10.

As best illustrated in FIGS. 3 and 5, the apparatus 10 also includes a blower head 100 positioned adjacent to the discharge zone 79 of the conveyor belt 78. The blower head 100 is positioned adjacent to the uppermost end of a tubular conduit 102 which operatively is coupled with a fan 104. The fan 104 is of any suitable design and also is coupled with the power plant 64 through a drive shaft and suitable gear box, not designated, similar to the gear box 66. As a practical matter, the gear box 66 also can be employed in driving the fan 104.

The blower head 100 preferably is directed to impinge on the article in a transverse direction, relative to the path of the articles, as they are delivered by the conveyor 76 into the portable article receiving bin 16. Thus foreign matter, which is of less mass, can be separated from the articles as the blower head directs a transverse stream of air against the articles as they fall from the conveyor 76 into the bin 16 therebeneath. Thus a delivery of the foreign matter into the bin 16 is impeded and in many instances obviated.

OPERATION

It is believed that in view of the foregoing description, the operation of the apparatus will be readily understood and it will be briefly reviewed at this point.

With the gathering apparatus 10 coupled with a tractor 14 through a three-point hitch 12, in the manner hereinbefore described, the article-collecting wings 22 are suspended in an operative relationship with the forward portion of the tractor 14 in a manner such that the wings engage the surface of the ground for collecting and windrowing articles, such as nuts and the like, as the tractor is caused to progress along a predetermined path.

With the apparatus 10 thus united with a tractor 14, a portable article-receiving bin 16 is coupled therewith through the hitch 20 in a tandem relationship therewith and beneath the discharge zone 79 of the conveyor 76. A single operator may now tow the apparatus 10 through a selected area.

As the apparatus 10 is towed by the tractor 14, the windrowing wings 22 engage and impart lateral motion to the discrete articles engaged thereby for causing the articles to be translated and deposited in a windrow. Continued advancement of the tractor 14 causes the delivery wings 84 next to engage the articles deposited in the windrow and feed the articles into the throat 74 whereupon the articles are engaged by the member 44 of the impeller 36 and advanced along the ramp 70. As the articles are advanced along the ramp 70, in response to a rotation of the driven impeller 36, foreign matter, such as rocks, leaves, dirt and the like, is permitted to fall between the individual rods 72 of the ramp 70. It is to be understood that the resilient peripheral member 44 is driven at a rate sufficient to propel the articles along a predetermined trajectory toward the conveyor 76 of the transfer device 37 as they are discharged from the ramp 70. The flight bars 80 engage and advance the articles toward the discharge zone 79 of the conveyor 76.

As the articles are transported to the discharge zone 79 of the conveyor 76, they are permitted to gravitate into the portable article-receiving bin 16 in a continuous stream.

In order to impede the delivery of "trash" into the bin 16 a continuous stream of air is delivered by the blower head 100 transversely through the stream of articles. Of course, the velocity of the stream of air delivered by the blower head 100 is compatible with the mass of the articles of the stream of articles being delivered into the bin 16.

In view of the foregoing, it should readily be apparent that the gathering apparatus embodying the instant invention, is particularly suited for use in harvesting nut crops, such as walnuts and the like, randomly deposited on the ground beneath the parent trees. The simplicity and economic construction of the apparatus affords a single operator an opportunity to mechanically harvest nuts on a relatively small scale heretofore believed to be economically impractical.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A gathering apparatus for gathering nuts randomly deposited on the ground beneath parent trees adapted to be towed along a given path by a wheeled tractor comprising:

A. a frame supported by a pair of parallel drag plates;
   B. windrowing means including a pair of angularly related plates suspended from the tractor in an oblique relationship with the path for depositing in a windrow nuts being gathered;
   C. an impeller assembly supported by said frame disposed in a trailing relationship with said plates including,
      i. a resilient impeller member of a toroidal configuration supported for driven rotation about an axis extended in a transverse relationship with said path, and
      ii. an article ramp suspended adjacent to the peripheral surface of the resilient member having a plurality of laterally spaced rods extending from a point slightly above the ground to a point substantially elevated with respect to the ground, whereby nuts deposited in the windrow are engaged by said toroidal member and advanced along the surface of an article ramp and propelled therefrom as the member is driven in rotation;
   D. an inclined conveyor supported by said frame including a driven belt extending from a pick-up point adjacent to the ramp to a delivery point elevated with respect thereto for receiving and conveying nuts propelled from said ramp;
   E. a pneumatic blower operatively associated with said conveyor adapted to pneumatically sweep foreign matter from the nuts conveyed by the conveyor belt;
   F. a power-delivery engine mounted on said frame and operatively coupled with said resilient member, said conveyor belt and said pneumatic blower for concurrently driving the member, the conveyor belt and said blower as the gathering apparatus is towed along said path by said tractor; and G. a portable article-receiving bin coupled with said frame and positioned beneath said delivery point.

2. The apparatus of claim 1 wherein said resilient member is provided with a plurality of transverse cleats circumferentially spaced about the periphery thereof and radially extended therefrom.

3. In a fruit and nut harvester, an impeller including a pneumatically inflated torus-shaped member of resilient elastic material, means mounting the member for rotation about a substantially horizontal axis and for earth traversing movement along a path extended substantially in the plane of the member, resilient cleats integral with the member and peripherally disposed in planes radial to said axis, drive means coupled with the member for rotating it at a peripheral speed greater than the speed of earth traversing movement thereof, whereby the cleats have predetermined orbits of travel, a ramp extending upwardly from beneath the member in the direction of rotation of the member, and means supporting the ramp in adjacent spaced relation to the orbits of said cleats defining a throat between the ramp and the member through which the cleats successively travel.

4. A gathering apparatus for gathering discrete articles randomly distributed on a substantially planar surface comprising:

A. means for receiving and delivering discrete articles including a portable impeller supported for travel along a given path traversing said surface, including a pneumatically inflated member of a substantially toroidal configuration, having an elastic surface, supported for driven rotation about a horizontal axis, and a ramp supported adjacent to said member for receiving articles delivered thereto to be engaged by said elastic surface;

B. means for imparting rotation to said member for engaging and advancing articles along said ramp; and C. receiver means supported in operative alignment adjacent to said ramp for receiving articles delivered thereto from said impeller, including an inclined, endless conveyor belt having a terminal portion disposed adjacent to said ramp.

5. The apparatus of claim 4 further comprising a pair of article collecting wings supported in an oblique relationship with respect to said path at opposite sides of said ramp for engaging articles to be delivered to said ramp.

6. A gathering apparatus for gathering discrete articles randomly distributed on a planar surface comprising:

A. a rotatable member having a peripheral portion substantially conforming to toroidal configuration provided with a resilient, elastic peripheral surface;

B. an upwardly inclined article ramp supported in juxtaposition with said member for receiving thereon articles delivered thereto;

C. receiver means aligned in juxtaposition with said ramp for receiving articles therefrom; and D. drive means operatively coupled with said rotatable member for imparting a selected rate of rotation thereto, whereby articles received by said ramp are engaged by said member and advanced therealong to said receiver.

7. The apparatus of claim 6 wherein said ramp is of a generally arcuate configuration and having a radius of curvature extending to the center of the adjacent peripheral portion of said member.

8. The gathering apparatus of claim 6 further comprising a pneumatic blower operatively associated with said receiver means for pneumatically separating foreign matter from said articles.

9. The gathering apparatus of claim 8 wherein said receiver means includes an inclined, endless conveyor belt having a terminal portion disposed adjacent to said article ramp.

* * * * *